June 25, 1968 R. W. WILKS 3,389,787

UNMOUNTED COMPONENT TRANSPORT

Filed Feb. 16, 1966 2 Sheets-Sheet 1

June 25, 1968 R. W. WILKS 3,389,787

UNMOUNTED COMPONENT TRANSPORT

Filed Feb. 16, 1966 2 Sheets-Sheet 2

United States Patent Office 3,389,787
Patented June 25, 1968

3,389,787
UNMOUNTED COMPONENT TRANSPORT

Ramon W. Wilks, Richardson, Tex., assignor to Texas Instruments Incorporated, Dallas, Tex., a corporation of Delaware Filed Feb. 16. 1966, Ser. No. 527,957
10 Claims. (Cl. 209—73)

ABSTRACT OF THE DISCLOSURE

Disclosed is an apparatus for conveying an electrical component by means of oppositely threaded screws with means of supporting the screws at one end in a substantially horizontal, parallel, spaced-apart relation. Electrical components such as resistors, capacitors, diodes having a central body section with axial leads may be transported by the apparatus and classified according to the characteristics of each component.

This invention relates to conveying electrical components, and more particularly to the stepwise movement of a train of electrical components as through a sensing system which conditions delivery means at the conveyor output.

Production of electrical components, such as diodes, resistors, capacitors, rectifiers, and other axial lead devices, often is followed by testing and classification of the product. Heretofore, such elements have been handled by means including carrier blocks, paper tape mounting arrangements, jigs of various sorts, walking beams, and the like. All such arrangements have been found to have built-in disadvantages, such as the cost of the carriers, short mechanical life, fixed cost of tape, or slow-down times due to the presence of increased mass of the moving parts introduced by the carrier.

The present invention is directed to an improved feeding system wherein no additional mass is added to the part to be delivered or classified, and comprises a feeding system which is inexpensive and simple to fabricate and which lends itself to extremely high-speed transit of the components and which is characterized by a long life.

In accordance with the invention, a transport system is provided for electrical components having oppositely directed leads which includes a pair of oppositely threaded screws with means for supporting the screws at one end in a substantially horizontal, parallel, spaced-apart relation. The threads on the screws run out at the end opposite the support without obstruction. Drive means is provided for counter-rotating the screws. Metering means positioned over the screws is adapted to drop components towards the screws with the component body positioned between the screws and with the leads directed into selected thread grooves. The metering means is synchronized with the rotation of the screws to supply one component for each groove passing the metering means.

For a more complete understanding of the present invention and for further objects and advantages thereof, reference may now be had to the following description taken in conjunction with the accompanying drawings in which.

Figures 1, 2:
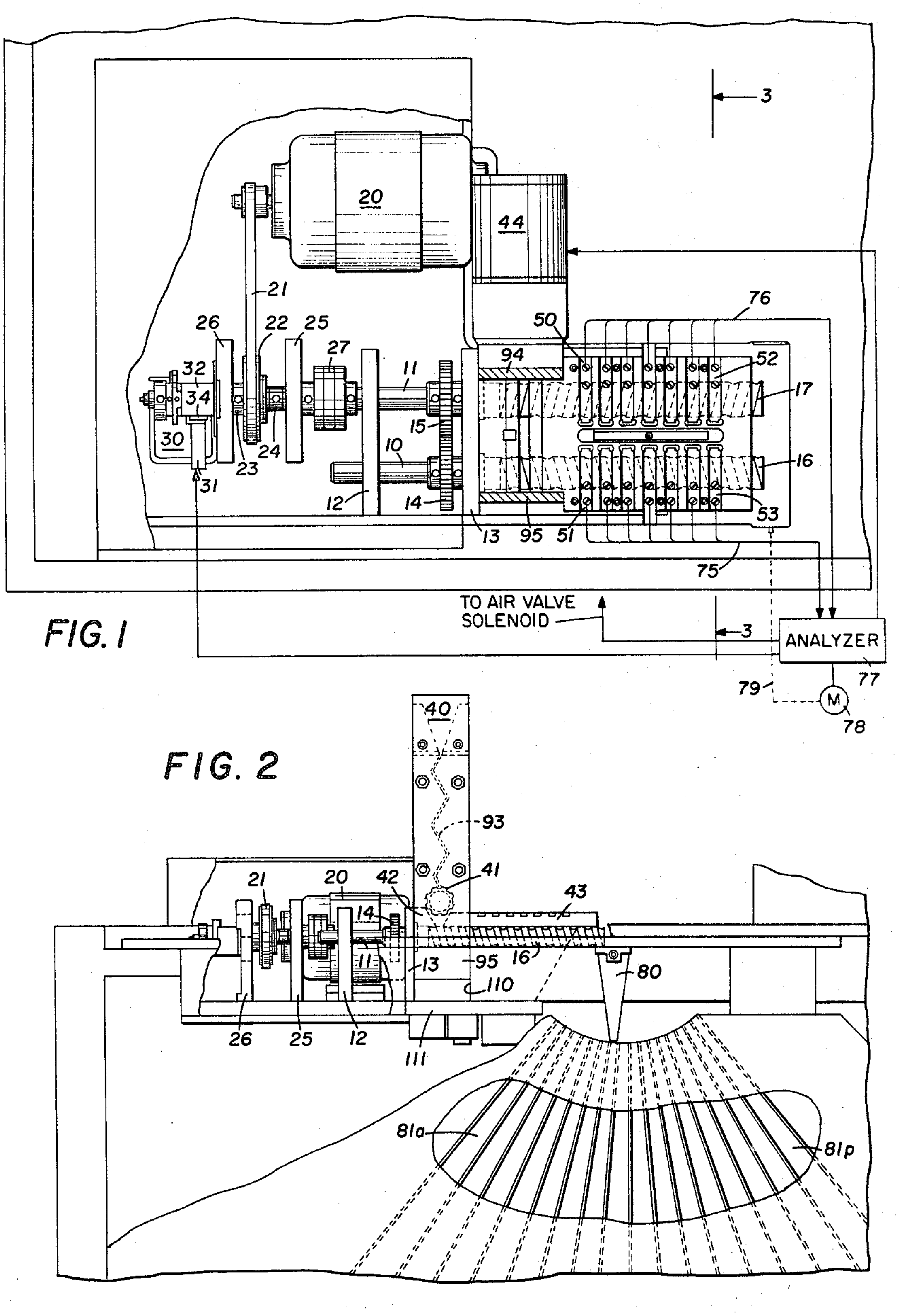
FIGURE 1 is a top view of a component classifier embodying the present invention.
FIGURE 2 is a side view of the system of FIGURE 1.

In the embodiment of the invention illustrated in the drawings, electrical components are received, tested, and classified into sixteen different categories. This is completed without the use of carrier blocks, jigs, or the like. The production rate may be of the order of 10,000 units per hour. The system is based upon the use of a pair of counter-driven threaded cylinders or screws, one with right-hand threads and the other with left-hand threads. Electrical components, such as resistors, capacitors, diodes, and the like, having a central body section with stiff electrical leads extending axially from opposite ends of the body, may be classified in this system. Components are successively dropped onto the screws with the leads resting in the grooves in the screws. The screws rotate intermittently in opposite directions successively to move the components into registration with different sensing stations located along the screws. At each sensing station, the component is lifted from the carrier screws into contact with sensing electrodes. A control system then provides for delivery of the component to a selected chute as the component is dropped from the ends of the screws. Classification is effected by the positioning of the output delivery nozzle in dependence upon measurements made on the component.

In the top view of FIGURE 1, a pair of shafts 10 and 11 are mounted in pillow blocks 12 and 13. Keyed to the shafts 10 and 11 are identical gears 14 and 15, respectively, which mesh with one another. Integral with shafts 10 and 11 but located on the side of the pillow block 13 opposite the gears 14 and 15 are left-hand and right-hand screws 16 and 17. The screws 16 and 17, extending in cantilever fashion away from the pillow block 13, rotate with shafts 10 and 11, respectively, in opposite directions.

Shaft 11 is driven by a motor 20 which is coupled by a belt 21 to a pulley 22. Pulley 22 is mounted on cylinder 23 as an idler coaxially supported by a shaft 24. Shaft 24 and cylinder 23 are supported by pillow blocks 25 and 26. Shaft 24 is coupled by way of a flexible coupling 27 to shaft 11.

A solenoid-actuated clutch mechanism 30 serves to couple cylinder 23 to shaft 24 each time the solenoid coil 31 is energized. Energization of coil 31 releases a latching cylinder 32, permitting the shaft 24, which carries 32, to rotate with cylinder 23. Latch cylinder 32 is coupled to cylinder 23 internally and frictionally. Thus, when the solenoid 31 is energized, it retracts a latching bar which engages a detent 34 formed on the surface of the cylinder 32. The shaft 11 and thus both of the screws 16 and 17 rotate one complete revolution every time solenoid 31 is energized. The clutch unit 30 is of the type shown at pages 1–2–1 and 1–2–2 of Friden Service Operation and Adjustment Manual, by Friden, Inc. (1962).

Figure 3:
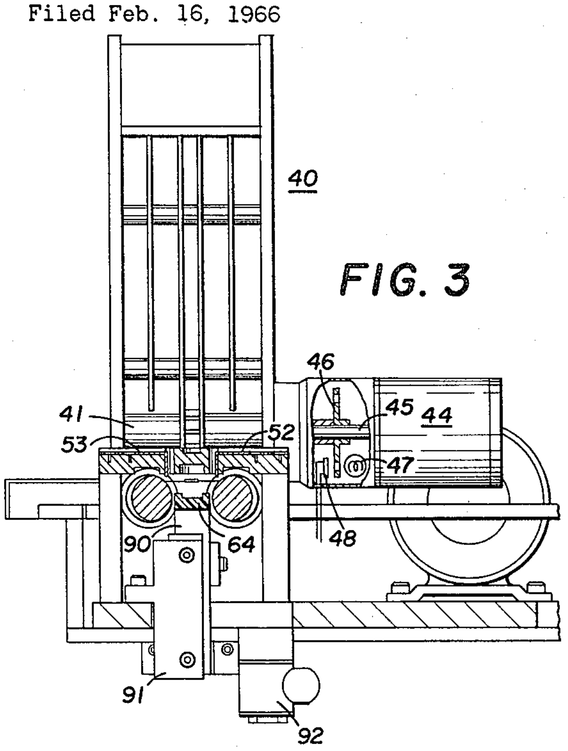
FIGURE 3 is a sectional view taken along lines 3—3 of FIGURE 1.

As shown in FIGURES 2 and 3, a supply chute 40 is mounted astraddle one end of the screws 16 and 17 and includes a metering drum 41. Resistors, diodes, or condensers, or the like, having a central body with leads extending from opposite ends thereof, delivered to the metering drum 41 are dumped one at a time onto the screws 16 and 17.

A V-shaped trough, open at the bottom, is located immediately below metering drum 41. One side of the trough is formed by a bar 42 secured to the face of the pillow block 13 opposite gears 14 and 15. The other side is formed by the beveled leading end of a sensor plate 43.

The metering drum 41, driven in steps of one-eighth of a revolution, is powered by an escapement motor 44. The motor 44 is coupled to the drum by a shaft 45. A disk 46 on shaft 45 has eight uniformly spaced holes in the periphery thereof. A lamp 47 on one side of the disk 46 and a photocell 48 on the other side of the disk, cooperate with disk 46 to produce an output pulse to deenergize the escapement motor at the end of each one-eighth turn.

Components to be tested are moved by the twin screws 16 and 17 stepwise beneath the sensor plate 43. At each of a plurality of stations, each component is raised from its nest in the grooves of the twin screws 16 and 17. Movement is upward by means of a cushion block so that the leads of the component engage downwardly extending ends of contact springs.

Figure 4:
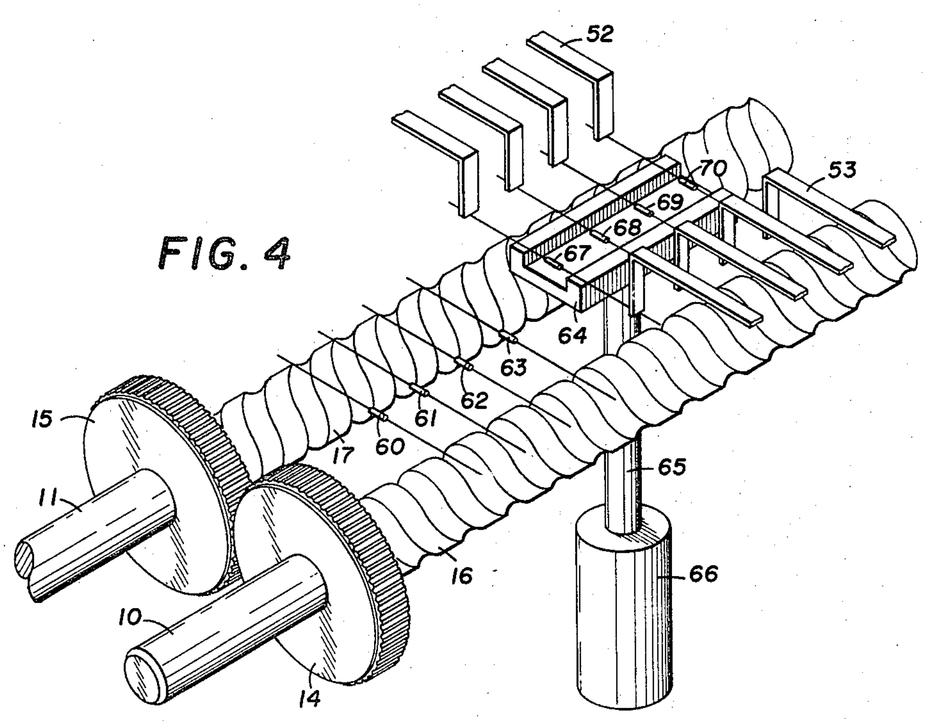
FIGURE 4 is an enlarged functional view showing the twin screws and a sensing mechanism.

With the system shown, seven sets of contacts are provided for seven different measurements on each component. The first pair of contacts includes the springs 50 and 51. The next pair of contacts includes the springs 52 and 53. As best shown in the enlarged view of FIGURE 4, each groove in screws 16 and 17 supports a component, such as a diode 60. Diodes loaded at the location of diode 60 are moved stepwise to the positions of diodes 61–63. At the latter station, the diodes are elevated by a cushion block 64 mounted on a piston 65 driven by an air cylinder 66. When the cushion block 64 is elevated, the diodes 67, 68, 69, and 70 are elevated so that they contact the down-turned ends of contact springs. It will be seen that the diode 70 is in contact with springs 52 and 53. It is to be understood that the cushion block 64, as employed in the system of FIGURES 1–3, will extend under seven diodes and seven contact springs so that measurements are made simultaneously on each of the seven components. The sensor plate 43 is of electrically insulated material. Electrical circuit connections are individually applied by way of cables 75 and 76 to an analyzer 77 which controls a motor 78. The motor 78 is coupled by linkage 79 to a sorting nozzle 80, FIGURE 2. The electrical properties of the component, as sensed through the contacts 50–53 by the analyzer 77, controls the position of the nozzle 80 as a given component drops off the end of the screws 16 and 17. As a result, the component is classified and handled by way of a selected one of chutes **81*a*–81*p*** and is thus deposited in a container with all components having like characteristics.

As best seen in FIGURE 3, the pillow block 64 is mounted at the upper end of an elevator 90. The elevator 90 is mounted in a guideway 91 so that the only motion permitted is rectilinear and is vertical. The piston 65 (shown in FIGURE 4) is coupled to the pillow block 64 behind the guideway 91, as shown in FIGURE 3. The elevating force is applied to the pillow block 64 independent of the guide structure 90–91. A solenoid-actuated air valve 92 is positioned in the supply line leading to the cylinder 66 of FIGURE 4. In operation, the analyzer 77 periodically applies an energizing pulse to the solenoid 31, to the start control means for motor 44 and to the control circuit for the valve 92. As the screws 16 and 17 begin to turn, the cushion block 64 is rapidly lowered and the motor 44 is de-energized. The last component dropped by the metering drum 41 is then moved by the screws one step forward towards the test location. The series of measurements made on each component is employed to control the position of escapement motor 78.

Figure 5:
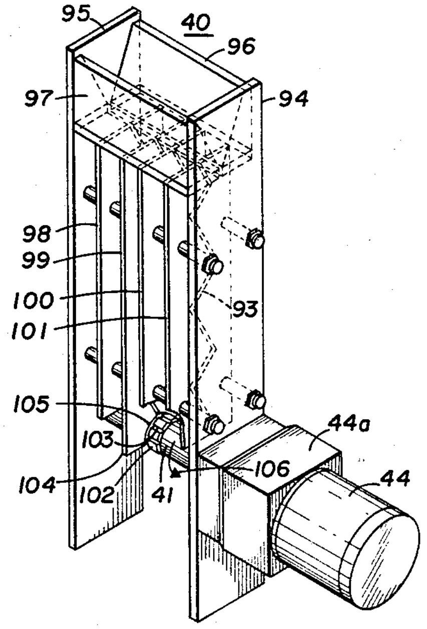
FIGURE 5 is an isometric view of the supply chute.

As shown in FIGURE 5, the supply and metering unit 40, including the metering drum 41, has a pair of end plates 94 and 95. A pair of blocks 96 and 97 mounted at the upper ends of the plates 94 and 95 form a downwardly directed chute leading to the openings or slots 93 between four pairs of guideplates 98–101. The plates 98–101 are supported in spaced-apart relation by bolts (not shown) extending between plates 94 and 95.

The metering drum 41 has a centrally located cylindrical ring 102 integrally formed thereon with uniformly spaced slots, such as the slot 103, cut in the surface thereof and extending parallel to the axis of drum 41. The plates 99 and 100 are positioned adjacent to the ends of the ring 102 and have portions, such as the portion 104, extending downward and around a portion of the metering drum 41. The curved boundary 105 has a radius slightly greater than the radius of the ring 102. Thus, the components dropped into the slot 103 on the metering drum are locked into the drum until the drum rotates as in the direction of arrow 106 past the end of curved boundary 105 and to the point that the component is to be dropped onto the screws 16 and 17.

The motor 44 and the housing **44*a* for the light disk 46 are mounted on the plate 94 in axial alignment with the metering drum 41. The lower ends of plates 94 and 95 extend downwardly beyond the housing 44*a* to serve as supporting legs for the unit 40. As shown in FIGURE 2, the lower end of plate 95 rests on a block 110 which in turn is supported by the base plate 111. As shown in FIGURE 1, the lower ends of the plates 94 and 95 slip into guideways adjacent to the pillow block 13**.

It has been found that two-pitch Acme threaded screws, one of right-hand and one of left-hand threads, are preferred. Using a one-revolution per pulse clutch, transit times as low as 50 milliseconds have been found to be practical. When used with test equipment, test rates of 10,000 components per hour or higher have been found to be practical. It will be appreciated, however, that this system may be employed in connection with the printing of symbols on components, where no measurements are made. In such case the cushion block would be provided with a nest in which a component body would fit as to be elevated into contact with a printing die. It may be employed with lead straighteners or with packaging machines. The system has been found to have extremely low maintenance costs, while providing high-speed transport of components.

In the system illustrated, the two-pitch Acme threaded screws 16 and 17 were employed with a drive for rotating them one full rotation each cycle. The metering drum was provided with eight slots, such as the slot 103. In this case, the metering drum was rotated one-eighth of a revolution during each stop between cycles of rotation of the screws 16 and 17.

The twin leads screws are described as being rotated with a fixed index time and a fixed stop or dwell time. However, either the index time or the dwell time can be varied. The system can also be run continuously for use as a transport only. Further, it is not limited to components having axial leads, as in the case of the components shown in FIGURE 4, but may be employed to move carriers, jigs, or the like.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A system for transporting components having oppositely extending leads, which comprises:

(a) a pair of oppositely threaded screws, (b) means for supporting said screws substantially horizontal in a parallel spaced-apart relation with the threads on said screws running out at one end without obstruction, (c) means for counter-rotating said screws, and (d) metering means positioned over said screws synchronized with rotation of said screws to drop said leads of each of said components into selected thread grooves in said screws.

2. The combination set forth in claim 1 in which the tops of said screws move toward each other when rotating.

3. The combination set forth in claim 1 wherein said screws are rotated stepwise and wherein said metering means drops one of said components during each stop of said screws.

4. In a classifier for electrical components which have oppositely extending leads, the combination which comprises:

(a) a pair of oppositely threaded screws, (b) means for supporting said screws at one end with said screws extending substantially horizontal in a parallel laterally spaced-apart relation, (c) means for simultaneously rotating said screws in opposite directions, and (d) means operated in synchronism with rotation of said screws for dropping components successively toward said screws with said leads oriented transversely of said screws and directed into selected grooves therein.

5. The combination set forth in claim 4 in which an array of electrode pairs are supported above said screws with one electrode pair corresponding with each stop in transit of said components along the length of said screws and with means operated in synchronism with said screws for elevating said components into contact with said electrodes at each of a plurality of stops.

6. The combination set forth in claim 5 in which a delivery chute is positioned to receive each component dropping from the ends of said screws, and in which a control system is connected to said electrodes and controls the position of said chute in response to measurements on each said component.

7. The combination set forth in claim 4 in which a transverse metering drum is positioned above and adjacent the supported end of said screws and extends laterally thereacross and is driven in synchronism with rotation of said screws for dropping one component at a time onto said screws.

8. The combination set forth in claim 7 in which an open-bottom trough extending laterally across said screws directly beneath said metering drum is formed in part by a sensing plate which extends parallel to and above said screws and has measuring electrodes therein, with one pair of electrodes at each of a plurality of stops of said screws, and wherein an elevator is adapted to be actuated during each stop of said screws simultaneously to raise a plurality of said components into contact with said electrodes.

9. The combination set forth in claim 4 in which a rotational power source continuously activated is intermittently coupled to one of said screws for one cycle of rotation thereof with said one screw being geared to the other screw for simultaneous counter-directional rotation of $360/n°$ per stop where $n$ is the number of threads per screw.

10. A classifier for electrical components having leads oppositely extending from a body, which comprises:

(a) a gravity feed means including a vertically descending guideway terminating in a metering drum, (b) a pair of oppositely threaded screws positioned beneath said drum with their axes substantially horizontal and perpendicular to the axis of said drum, (c) a pair of support means for mounting said screws at one end thereof adjacent to said drum with said screws cantilevered from said support means with the threads running out at the ends opposite said support means without obstruction, (d) structure forming at trough having an open bottom positioned beneath said metering drum and above said screws, (e) a rotational drive means, (f) a clutch synchronized with said drum for intermittently coupling said drive means to a first of said screws, (g) gears coupling the first screw to the second of said screws for counter-rotating said screws to move components away from said support means, (h) a sensor plate mounted above said screws on the side of said drum opposite said support means and having at least one pair of spaced electrodes extending downwardly toward the zone between said screws, (i) elevating means synchronized with said screws and positioned between said screws for lifting at least one component from said screws into contact with said electrodes during each stop of said screws, and (j) means conditioned by contact between a given component and said electrodes for receiving said given component as it drops from the end of said screws.

References Cited

UNITED STATES PATENTS

| | | | |
|---|---|---|---|
| 1,737,438 | 11/1929 | Stearns | 209—107 |
| 3,032,191 | 5/1962 | Clukey | 209—81 X |
| 3,198,330 | 8/1965 | Wiesler | 209—74 |

M. HENSON WOOD, Jr., *Primary Examiner.*

R. A. SCHACHER, *Assistant Examiner.*